United States Patent [19]

Kasabian

[11] 4,006,996
[45] Feb. 8, 1977

[54] POSITIVELY DRIVEN TOOL HOLDER FOR A HIGH SPEED ROTATABLE SPINDLE

[75] Inventor: Jack Kasabian, Franksville, Wis.

[73] Assignee: The Precise Corporation, Racine, Wis.

[22] Filed: Dec. 1, 1975

[21] Appl. No.: 636,579

[52] U.S. Cl. .......................... 408/239 A; 279/1 B; 279/102; 408/226

[51] Int. Cl.² ................... B23B 31/08; B23B 33/00

[58] Field of Search ............ 408/239, 238; 279/1 B, 279/1 SG, 24, 79, 89, 90, 96, 102, 103, 1 R

[56] References Cited

UNITED STATES PATENTS

| | | | |
|---|---|---|---|
| 2,484,027 | 10/1949 | Haffey | 279/102 X |
| 2,772,094 | 11/1956 | Jamilkowski et al. | 408/238 X |
| 2,869,883 | 1/1959 | Dunbar | 279/102 X |
| 3,687,467 | 8/1972 | Kosmowski | 279/102 X |
| 3,691,883 | 9/1977 | Ingram | 408/239 X |
| 3,753,622 | 8/1973 | Miller | 408/239 X |

FOREIGN PATENTS OR APPLICATIONS 992,583   5/1965   United Kingdom ............... 408/238

Primary Examiner—Francis S. Husar
Assistant Examiner—W. R. Briggs
Attorney, Agent, or Firm—James E. Nilles

[57] ABSTRACT

A tool holder for easy and quick insertion in and removable from a high speed spindle of a machine tool. The tool holder is positively driven by the spindle by means of a quickly engagable and disengagable clutch. A drive adapter is insertable in the bore of a conventional spindle and has a drive clutch element which is disengagably connected with a complementary drive clutch element of the tool holder. The tool holder also has a resilient, flexible means in the form of an O-ring which frictionally engages the interior of the spindle so as to prevent inadvertent removal of the tool holder when reverse rotational forces are applied on the tool or at lower speeds of the spindle. The resilient, flexible means is centrifically urged in tight frictional engagement with the spindle when the latter is operating.

4 Claims, 3 Drawing Figures

POSITIVELY DRIVEN TOOL HOLDER FOR A HIGH SPEED ROTATABLE SPINDLE

BACKGROUND OF THE INVENTION

1. Field of Use

The present invention pertains generally to high speed drills or the like which operate, for example, in the neighborhood of 50,000 RPM. The drills or other tools usable with these high speed spindles must be quickly, easily, and often frequently removed and/or replaced.

2. Description of the Prior Art

Examples of prior art tools with which the present invention find utility, are shown in my U.S. Pat. Nos. 3,840,767 of Oct. 8, 1974; 3,807,815 of Apr. 30, 1974; and 3,794,335 of Feb. 26, 1974, all of which are owned by the assignee of the present application.

Certain other prior art devices of this general character have used centrifically-operated driving connections between the tool holder and the spindle, but their use has been somewhat unsatisfactory because of slipping of the tool when excessive resistance was build up to the tool during the drilling operation, and consequently, a positive rotation of the tool could not be assured. Furthermore, some of these prior art devices had no provision for ensuring that the tool holder remain in the spindle when the rotational forces on the tool were reversed or when the spindle is operating at low or no speed.

Examples of some prior art tools of this general type are shown in Kosmowski U.S. Pat. Nos. 3,795,455 of Mar. 5, 1974; 3,687,467 of Aug. 29, 1972; and 3,672,256 of June 27, 1972.

SUMMARY OF THE INVENTION

The present invention provides a positively driven tool holder for a high speed rotational spindle of a machine tool and which holder can be easily and quickly removed from the spindle and at the same time is retained therein against inadvertent removal under certain operating conditions. More specifically, the invention provides such a tool holder which has a drive clutch element at its inner end which is axially engaged with but non-rotatably connected in respect to a positive drive adapter secured within the spindle. The invention furthermore provides such a tool holder which has resilient, flexible means, such as an O-ring, located in an annular groove around its periphery and which frictionally engages the interior of the spindle to hold the tool holder within the spindle regardless of the relative rotational direction between the spindle and tool holder or regardless of the speed thereof.

The invention provides a positive drive adapter which can be threadably or otherwise secured within a conventional spindle to thereby permit conventional spindles, such as the centrifically operated tool holder type, to be converted into a positively driven tool holder type.

A more specific aspect of the invention relates to a tool holder of the above type which has a diametrically enlarged outer end that defines a shoulder abuttable against the free end of the spindle to thereby define the limit to which the tool holder may be inserted into the spindle.

These and other objects and advantages of the present invention will appear hereinafter this disclosure progresses reference being had to the accompanying drawings.

DESCRIPTION OF PREFERRED EMBODIMENTS

Figure 1:
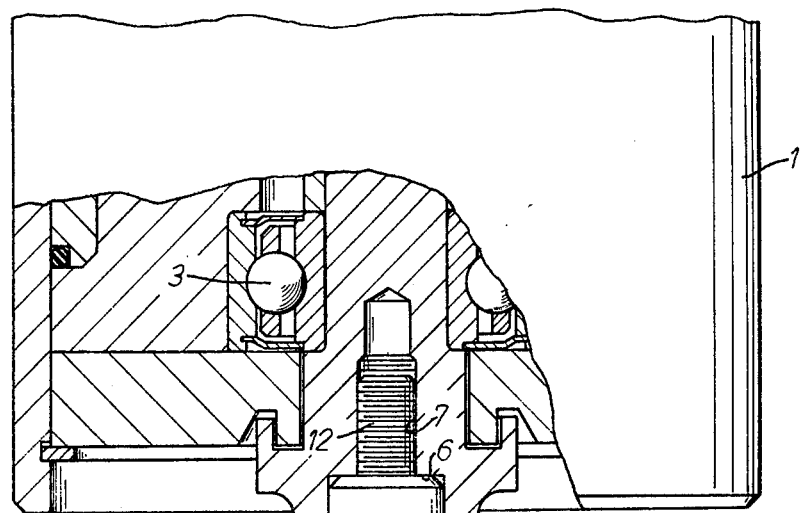
FIG. 1 is a fragmentary view of the portion of a machine tool embodying the present invention, certain parts being shown as broken away or in section for the sake of clarity in the drawings.

A portion of a machine tool 1 has been shown and which incorporates the present invention and includes a spindle 2 that extends from the tool and is mounted on a conventional anti-friction bearing assembly 3. Machine tools of this character are designed to operate at high speeds, for example, in the neighborhood of 50,000 RPM or even greater.

The spindle 2 has an axial bore 5 that terminates in an inner end 6. A threaded hole 7 is formed in the inner end 6 and extends into the spindle.

A positive drive adapter 10 has a diameter such that it snugly fits within the bore 5 of the spindle and the threaded stud 12 integrally formed on the end of the adapter is threadably engaged in the threaded hole 7 of the spindle. The other end of the adapter has a clutch drive element 14 in the form of a tang that extends from the main body of the adapter and in an axial direction.

Figure 2:
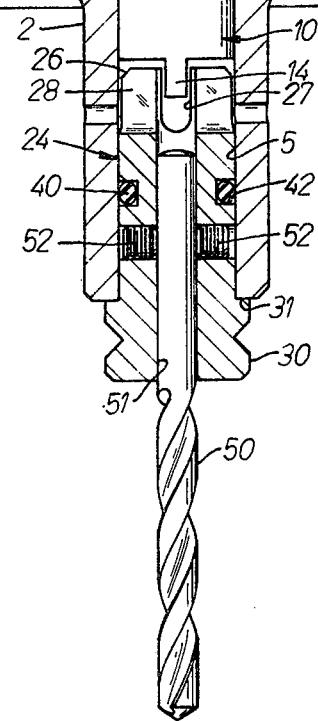
FIG. 2 is an exploded perspective view of the tool holder and positive drive adapter provided by the present invention and which are shown in FIG. 1.

A tool holder 24 has an inner end on which is formed a drive clutch element 26 which, in the embodiment shown in FIGS. 1 and 2, is comprised of a pair of transverse slots 27 and 28 formed axially in the tool holder and at right angles to one another. The tang or drive clutch element 14 of the adapter 10 compliments and is engagable in either of the transverse slots 27 and 28 when the tool holder is inserted in the bore 5 of the spindle. Thus, the tang and slots form a disengageable clutch between the adapter, that is in effect between the spindle and the tool holder.

The other end of the tool holder has a diametrically englarged end 30 that defines a shoulder 31 which is abuttable against the free end of the spindle, as shown in FIG. 1, to thereby limit the extent to which the tool holder can be inserted in the spindle.

The tool holder also has means for being frictionally held in the spindle to preclude its accidental removal therefrom, particularly when the rotational forces on the tool are reversed or when the spindle is operating at low speeds or is stopped and out of contact with the work (not shown). The means for frictionally holding the tool holder within the spindle is shown as a flexible O-ring 40 formed of rubber, neoprene, or the like and which is located in an annular groove 42 formed around the periphery of the tool holder. The O-ring engages the interior wall of the bore 5 of the spindle with sufficient frictional force to hold the tool holder in the spindle against accidental removal of the tool holder. When the spindle is rotating, centrifugal force acts on the O-ring to urge it radially outwardly into tighter engagement with the spindle bore.

A tool 50, shown here as a conventional drill, has its shank portion inserted in an axial hole of the tool holder and is held captive in the tool holder between diametrically opposed Allen head screws 52 or the like which thereby lock the tool within the tool holder at any preselected depth.

Figure 3:
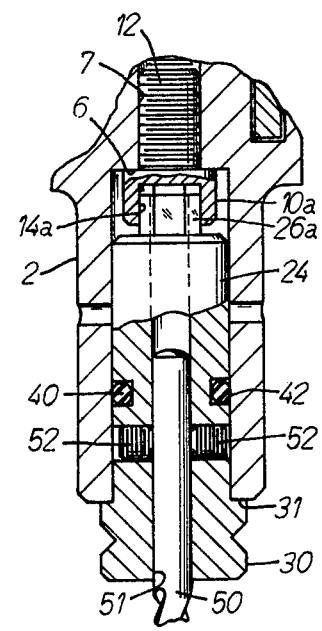
FIG. 3 is a view similar to a portion of the showing of FIG. 1, but showing a modified form of the invention.

A modification of the invention is shown in FIG. 3 and corresponding parts have been similarly numbered, sometimes with the suffix a. In this embodiment of the invention, the adapter 10a has a non-circular recess 14a formed therein, such as for example, of a hexagonal cross sectional shape. The tool holder has an axially extending hexagonal portion 26a that compliments the recess 14a and is engageable in and for driving engagement with the adapter in this embodiment. Also, it is only necessary to move the tool holder axially in order to engage or disengage it with the positive drive adapter.

I claim:

1. A tool holder for insertion in a smooth, uninterrupted bore of a rotatable spindle and having a free end extending therefrom and for securing a tool therein, said tool holder also having an end for insertion in said rotatable spindle for rotation by said spindle, said tool holder end which is inserted in said spindle having a drive clutch element, said element having drive surfaces circumferentially spaced apart so as to be concentrically balanced, said free end of said tool holder having a diametrically enlarged end which defines an integral shoulder for abutment with an end of said spindle to position said tool holder in said bore, said tool holder also having an axial hole therein for the reception of a tool, means carried by said tool holder for releasably locking said tool in said tool holder, said tool holder having an annular groove around its periphery, and a flexible o-ring in said groove and is of such size and resiliency so as to project slightly outwardly of the periphery of said tool holder and frictionally abut lightly against said spindle bore when said tool holder is inserted in the bore of said spindle, said O-ring being of such resiliency to be expanded by centrifugal force against said spindle when the latter is rotating.

2. A tool holder and positive drive adapter for insertion in a smooth and uninterrupted bore of a high speed rotatable spindle, said tool holder having a free end securing a tool therein and also having an end for insertion in said rotatable spindle for rotation by said spindle, said tool holder end which is inserted in said spindle having a drive clutch element, said end of said tool holder for securing a tool that extends from said spindle and having a diametrically enlarged end which defines a shoulder for abutment with an end of said spindle to thereby define the extent to which the tool holder is inserted in said spindle, said tool holder also having an axial hole therein for the reception of a tool, and resilient means carried by said tool holder for releasably locking said tool in said tool holder, said positive drive adapter having an inner end threadably engagable at one end in said bore of said spindle, the other end of said adapter having a drive clutch element which is complementary to and for driving engagement with said drive clutch element of said tool holder, said clutch elements being axially inter-engaging and having drive surfaces circumferentially spaced apart so as to be concentrically balanced.

3. The tool holder set forth in claim 2 further characterized in that said tool holder has an annular groove around its periphery, and a flexible O-ring is located in said groove and is of such resiliency so as to abut against said spindle when said tool holder is inserted in the bore of said spindle.

4. A high speed spindle having a positive drive tool holder and comprising, a rotatable and generally cylindrical spindle having a free end and having an axial bore terminating in an inner end, a drive adapter insertable in said bore and having a threaded portion at its inner end for threadable engagement in said inner end of said bore, said adapter having a concentrically balanced drive element at its other end, a tool holder snugly insertable in said bore and having a drive element at its inner end which complements said adapter drive element for rotatable driving engagement therewith, said drive elements having drive surfaces circumferentially spaced apart so as to be concentrically balanced, said tool holder extending from said bore and having an enlarged outer end which defines a radial shoulder, said radial shoulder abuttable against the free end of said spindle to position said tool holder in said bore, said tool holder having an axially extending aperture therein for the reception of a tool, means for releasably locking said tool in said tool holder at a preselected depth, and a resilient flexible means around the periphery of said tool holder and for engagement with the inner surface of said bore so as to frictionally engage said bore and prevent inadvertent removal of said tool holder from said bore, said resilient flexible means comprising an o-ring, said tool holder has an annular groove around its periphery in which said o-ring is inserted, said O-ring projecting slightly outwardly of the periphery of said tool holder, said O-ring being of such resiliency to be expanded by centrifugal force against said spindle when the latter is rotating.

* * * * *